Nov. 15, 1955  S. D. POOL  2,723,667
CANE STALK CHOPPER AND LEAF STRIPPING MECHANISM
Filed July 6, 1951  3 Sheets-Sheet 1
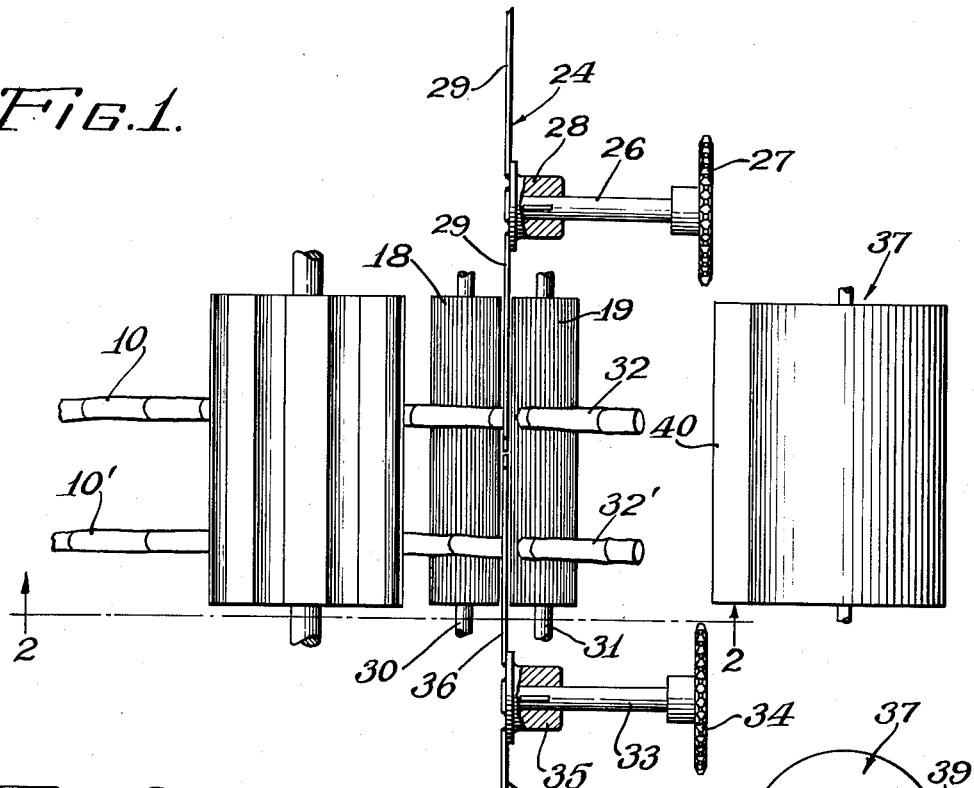
Fig.1.
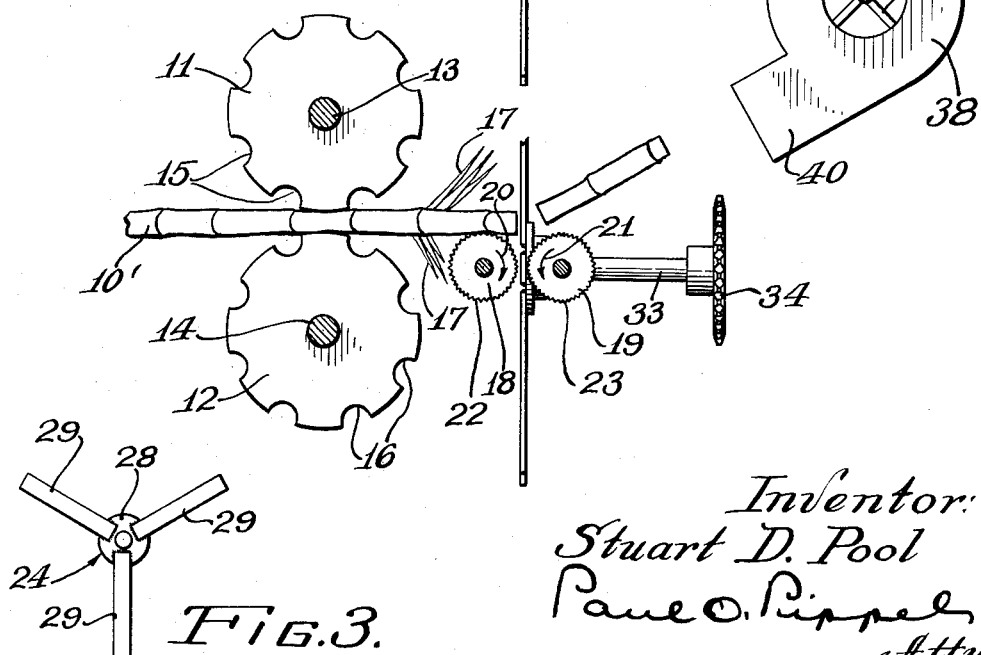
Fig.2.
Fig.3.
Inventor:
Stuart D. Pool
Atty.

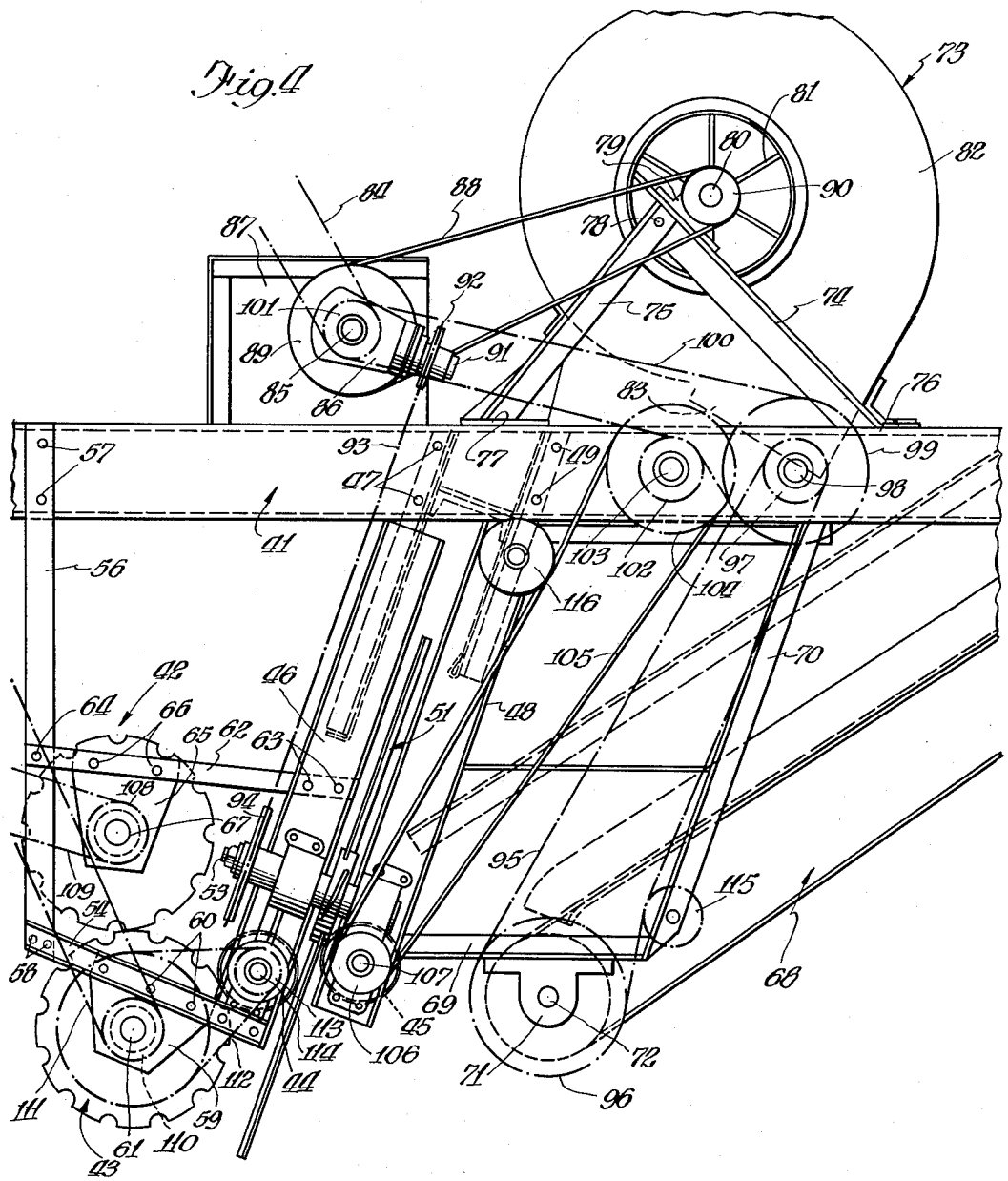

Nov. 15, 1955  S. D. POOL  2,723,667
CANE STALK CHOPPER AND LEAF STRIPPING MECHANISM
Filed July 6, 1951  3 Sheets-Sheet 3

Inventor:
Stuart D. Pool
By: Paul O. Pippel
Attorney.

United States Patent Office 2,723,667
Patented Nov. 15, 1955

2,723,667

CANE STALK CHOPPER AND LEAF STRIPPING MECHANISM

Stuart D. Pool, Moline, Ill., assignor to International Harvester Company, a corporation of New Jersey Application July 6, 1951, Serial No. 235,441

6 Claims. (Cl. 130—31)

This invention relates to a new and improved cane stalk chopper and leaf stripping mechanism and is a continuation in part of my copending application, now abandoned, having Serial No. 192,740 filed October 28, 1950.

A principal object of this invention is to provide a mechanism for simultaneously cutting cane stalks in short lengths and stripping cane leaves from the stalks.

An important object of this invention is to provide in combination cooperative leaf stripping rolls in combination with a knife cutter arranged and constructed to be propelled through the juncture between the cooperative rolls whereby when cane stalks are fed across the leaf stripping rolls the knife cuts the stalk into short lengths and simultaneously pushes the tough leaves down in between the cooperative leaf stripping rolls.

Another important object of this invention is the provision of means in a cane harvesting machine wherein full-length unstripped stalks are passed horizontally over cooperative leaf stripping rolls in combination with rotating knife elements positioned at each end of the cooperative leaf stripping rolls and adapted to have blades extend inwardly to a position adjacent the center of the rolls and the blades passing downwardly between the cooperative rolls to simultaneously cut the cane stalks into short lengths as they are fed across the rolls and strip the leaves from the stalks so that the machine delivers short lengths of clean cane stalks.

A still further important object of this invention is to supply in a cane stalk cutting and stripping machine a blower for the purpose of maintaining stripped green leaves in position over cooperative stripping rolls for discharge from the machine.

Still another and very important object of this invention is the provision of means in a cane harvester wherein the unstripped cane stalks are delivered at a relatively high velocity in a horizontal plane into the path of an angularly disposed rotating knife.

Another and further important object is to provide a rotating stalk cutting blade arranged in a harvesting machine angularly offset from a vertical line to receive stalks propelled in a horizontal plane in such a manner that although the blade is swinging downwardly the stalks tend to climb the angularly disposed blade thus eliminating the necessity of a shear plate or the like.

Another important object of this invention is to utilize the inwardly extending portions of spaced apart rotating choppers for effecting the cutting of the cane into short lengths and also stripping leaf material therefrom.

Still another object is the provision of offsetting the blades of cooperative spaced apart rotary chopping mechanisms and having the blades of the chopping mechanism partially overlapping whereby all cane stalks passing therethrough will be cut.

Other and further important objects of this invention will become apparent in the following specification and accompanying drawing.

The problem of removing cane leaves and trash from the cane stalks has long been present in the cane industry. The harvesting of cane stalks whether accomplished by hand or machine has in the past meant the bringing in of full length unstripped cane stalks. Thereafter the leaves would have to be stripped from the stalks and finally the stalks would be cut in short lengths. There has been no easy and generally acceptable way of performing the cane leaf stripping job. The stripping device of the present application employs cooperative stripping rolls which are common to many agricultural implements and in combination therewith employs a knife mechanism which by reason of the physical characteristics of the can leaves will deliver the leaves to and through the cooperative stripping rolls without in fact cutting the leaves. The knife cutters are propelled through the juncture between the cooperative stripping rolls as the stalks are fed across the rolls. The knives perform two functions simultaneously; first, they cut the cane stalks into short lengths; and, second, the stalk leaves are stripped from the stalk by reason of the action of the knife mechanism in combination with the cooperative stripping rolls. It is thus obvious that the device of this invention may be used directly on a field cane harvesting machine or may be used as a separate stationary unit to which previously harvested unstripped cane stalks may be delivered.

It has further been discovered that by positioning the rotary knife blades at an inwardly driving angle with respect to the horizontally propelled cane stalks no stripping rolls or shear devices are necessary to effect a sharp cutting of the stalks into short lengths and also a stripping of all the leaf material on the stalks. It should thus be apparent that the device of this invention contemplates the use of the rotary cutting mechanisms either with or without cooperative stripping rolls.

In the drawing:

Fig. 1 is a top plan view of the cane leaf stripper and stalk chopper of this invention.

Fig. 2 is a sectional view taken on the line 2—2 of Fig. 1.

Fig. 3 is an end view of one of the knife mechanisms of this invention.

Fig. 4 is a side elevational view of a modified form of the cane stalk cutter of this invention.

As shown in the drawing:

Figure 6:
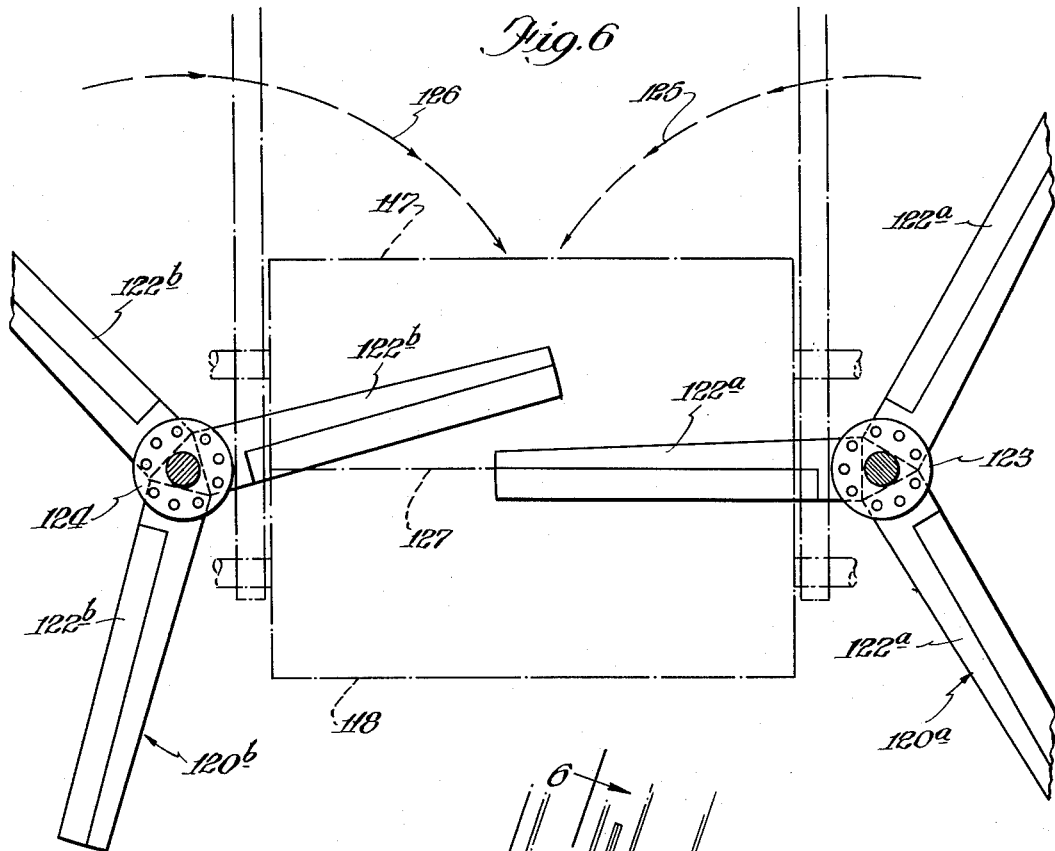
Fig. 6 is a sectional view taken on the line 6—6 of Fig. 5.

The reference numerals 10 and 10' indicate generally a plurality of cane stalks which may be delivered directly from field harvesting devices positioned forwardly of the stripper and chopper of this invention or which may be fed to the present machine after having been previously harvested. Cooperative feed rolls 11 and 12 are mounted on shafts 13 and 14 which are driven at a uniform relatively fast speed and are disposed in vertical alignment as best shown in Fig. 2 of the drawing. The peripheral surfaces of the rolls 11 and 12 are preferably corrugated as shown at 15 and 16 respectively. The stalks 10 are thus forcibly fed at a constant high rate of speed in a horizontal plane to a position rearwardly of the feed rolls 11 and 12. The stalks with their leaf foliage designated by the numeral 17 are thus moved over a pair of cooperative leaf stripping rolls 18 and 19. These rolls 18 and 19 rotate inwardly and downwardly as indicated by the arrows 20 and 21. The rolls 18 and 19 are further provided with serrated or corrugated circumferential surfaces 22 and 23 respectively for the purpose of better gripping the green cane leaves to pull them downwardly and strip them from the stalks 10.

Cutter mechanisms 24 and 25 are provided at both ends of the stripping rolls 18 and 19. The cutter mechanism 24 includes a shaft 26 driven by means of a sprocket 27 and carrying a rotor hub 28. The hub is provided with a plurality of radially extending spaced apart knife blades 29 as best shown in Fig. 3. The knife blades 29 are thus rotated in a plane lying parallel to the cooperative stripping rolls 18 and 19 and to the respective shafts 30 and 31 of these rolls. The rolls 18 and 19, as shown in both Figs. 1 and 2, are longitudinally spaced apart sufficiently to permit the passage of the knife elements 29 therebetween. The knives 29 are propelled at a considerable speed through the juncture between the rolls 1 and 19 and as shown in the drawing the stalks 10 are severed forming short lengths 32.

Similarly the knife mechanism 25 is provided with a shaft 33 driven by a sprocket 34 and provided with a rotor hub 35. Radially extending knife elements 36 are comparable to the knife elements 29. These knives 36 rotate in a plane parallel to the rolls 18 and 19 and complement the knives 29 of the knife mechanism 24 covering substantially the full length of the rolls 18 and 19. Each of the knife mechanisms 24 and 25 have their blades 29 and 36 rotating inwardly and downwardly through the space between the rolls 18 and 19. It is preferable in this form of the invention that these knives be timed to simultaneously pass through the cooperative rolls 18 and 19 to effect a cutting of all the stalks lying on and over the rolls.

In addition to the cutting of the stalks into short lengths 32 and 32', it is a principal function of the knives 29 and 36 to drive and/or push the tough green cane leaves and/or dry cane leaves downwardly through the rolls 18 and 19 to thus strip the leaves from the stalks 10 and 10'. The cane leaves 17, as previously stated, are tough and leathery so that the knives will not generally cut up the leaves but will usually bend them down through the rolls 18 and 19 whereupon the serrated surfaces of the cooperative rolls 18 and 19 pick up the leaves and help the stripping thereof from the stalks.

A blower 37 includes a housing 38, a fan 39 and a tangential delivery spout 40. A continuous blast of air is delivered through the spout 40 and impinges in a direction downwardly and forwardly over the cooperative stripping rolls 18 and 19 in such a manner that any loose leaves or trash which might fall forwardly over the rolls will be returned by the blast of air to the juncture between the rolls whereupon the cooperation of the knives 29 and 36 will insure delivery of the leaves and trash downwardly through the rolls for discharge thereof. This air blast is sufficiently strong to blow back any "leaf roll" which may be thrown across the stripper mechanism.

In the operation of the machine as shown in Figs. 1 to 3 inclusive, cane stalks are fed to the feeding rolls 11 and 12 whereupon the rolls with their corrugated peripheries feed the stalks rearwardly at a constant relatively fast rate of speed over the stripping and cutting mechanism of this invention. Thereafter the combined action of the cooperative stripping rolls 18 and 19, in conjunction with the knife members 29 and 36, cuts the stalks into short lengths and simultaneously strips the stalks of all leaf and trash material. This results in clean uniform short lengths of cane stalks immediately ready for delivery to refinery mills or the like. It is obvious that the length of stalk pieces may be regulated by varying the speed of the feed rolls and/or varying the speed of rotation of the knife members.

Figure 5:
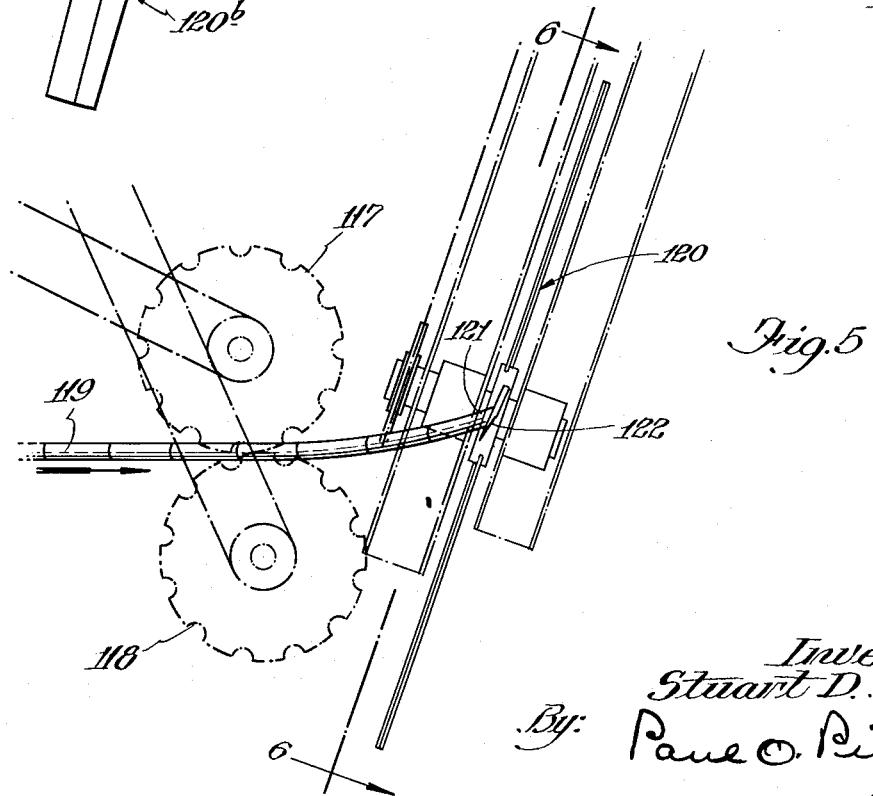
Fig. 5 is another side elevational view of a further modified form of cane chopper of this invention.

The device as shown in Figs. 1 to 3 inclusive is one form of applicant's invention. The devices of Figs. 4 and 5 are modified versions of the invention and their operation will be hereafter described. As best shown in Fig. 4, a frame 41 constitutes the main supporting structure of a cane harvesting machine which may be propelled through a field of standing cane or operated as a stationary cane chopper. The cane harvester includes cooperative corrugated feed rolls 42 and 43 comparable to the feed rolls 11 and 12 as shown in Fig. 2. Similarly, cooperative leaf stripping rolls 44 and 45 having serrated or milled circumferential surfaces are positioned rearwardly of the feed rolls 42 and 43 and substantially in horizontal alignment with the upper surface of the lower feed roll 44. A downwardly depending frame member 46 is attached at 47 to the main frame 41 and journally carries the leaf stripping roll 44. A spaced apart frame member 48 is attached at 49 to the main frame 41 and journally carries the leaf stripping roll 45. The frame members 46 and 48 lie parallel to one another and are angularly disposed so that they are inclined forwardly and downwardly. A channel frame member 50 bridges the frame members 46 and 48 and tends to maintain these members in a rigid spaced apart position.

A rotary knife chopper 51 having a hub 52 and a shaft 53 is journaled in the spaced frame members 46 and 48 just above the leaf stripping rolls 44 and 45. The shaft 53 is inclined from a high forward position to a low rearward position. The rotary knife chopper 51 is thus inclined forwardly and downwardly in the same manner as the frame members 46 and 48 and rotates within the space provided between these frame members. The rotary knife chopper 51 thus also passes downwardly between and through the cooperative leaf stripping rolls 44 and 45 in the same manner as the device of Figs. 1 to 3 inclusive.

The frame member 54 is fastened at 55 to the lower extremity of the frame member 46. The frame member 54 is inclined forwardly and upwardly and is joined by a downwardly depending frame member 56 which is fastened to the main frame 41 at 57. Rivets or the like 58 join the member 54 and the lower end of the member 56. A bracket 59 fastened at 60 to the frame member 54 depends therefrom and journally carries the shaft 61 of the corrugated feed roll 43. Another frame member 62 substantially horizontally disposed joins the depending frame member 46 at 63 and the depending frame member 56 at 64. A bracket 65 fastened by means of rivets or the like 66 to the frame member 62 journally carries the shaft 67 of the upper corrugated feed roll 42. It will thus be seen that the feed rolls and the stripping rolls, as well as the rotary knife chopper, are all hung from the main frame 41.

The cane harvester further includes an upwardly and rearwardly extending elevator 68 which receives the cut stalks for delivery rearwardly and upwardly to a trailing wagon or the like. The lower forward end of the elevator 68 is carried on a horizontally disposed frame member 69 which is fastened to the depending frame members 48 and is joined at its rearward end to a downwardly depending frame member 70. A hanger-type bearing 71 is fastened to the under side of the frame member 69 and journally carries the shaft 72 of the lower end of the elevator 68.

A fan 73 is mounted above the main frame 41 on a super structure comprising frame members 74 and 75. The frame member 74 is fastened to the main frame 41 at 76 and similarly the frame 75 is mounted on the main frame 41 at 77. The upper ends of the frame members 74 and 75 are joined together by means of rivets or the like 78. A pillow block bearing 79 mounted on the upper inclined surface of the frame member 74 and journally carries the shaft 80 of the fan 73. The fan 73 is provided with rotating fan blade members 81 and a housing 82. The housing 82 includes a discharge spout or nozzle 83 for directing a blast of air downwardly and forwardly over the cutting and stripping area of the machine defined by the cooperative leaf stripping rolls 44 and 45 and the included rotary knife chopper 51. The blast of air from the fan 73 tends to minimize the amount of light leaf material and trash that might ordinarily reach the wagon elevator 68. Thus the trash is cut loose by the rotating knife chopper 51 and thereupon carried downwardly by the combined forces of the stripping rolls 44 and 45 and the air blast from the fan 73.

The drive for the various rotating elements of this invention is obtained from several sources (not shown). A chain 84 imparts rotational drive to a shaft 85 which forms a part of a gear housing 86 mounted on a frame structure 87 carried on the main frame 41. The fan 73 is driven by means of a V-belt 88 joining a V-belt pulley 89 mounted on the shaft 85 and a V-belt pulley 90 mounted on the fan shaft 80. A shaft 91 projects outwardly at right angles to the shaft 85 from the gear box 86 and carries a sprocket 92. A chain 93 is driven by the sprocket 92 and imparts rotational drive to a sprocket 94 which is fastened for rotation with the shaft 53 of the rotary knife chopper 51.

The wagon elevator 68 is driven by means of a chain 95 which passes around a sprocket 96 which is fastened for rotation with the shaft 72 of the lower end of the endless conveyor elevator 68. The chain 95 receives its drive from a sprocket 97 on a shaft 98 journaled for rotation on the main frame 41. The shaft 98 also carries a relatively larger sprocket 99. A chain 100 delivers rotational drive from a sprocket 101 on the driven shaft 85 to the sprocket 99, and thus rotational drive is carried from the driven shaft 85 to the wagon elevator sprocket 96. The chain 100 passes over and drives an idler sprocket 102 which is mounted on the shaft 103 also journaled for rotation on the main frame 41. The shaft 103 carries a V-belt pulley 104 and by means of a V-belt 105 rotational drive is carried from the shaft 103 downwardly and forwardly to a V-belt pulley 106 on a shaft 107 which carries the cooperative leaf stripping roll 45.

The cooperative feed roll 42 is provided with a sprocket 108 and by means of a chain 109 drive is delivered to the roll 42. Similarly, the roll 43 receives its drive through a sprocket 110 having its rotative power delivered thereto by means of the chain 111. The shaft 61 carrying the lower cooperative feed roll 43 in addition to having the sprocket 110 thereon, also has a larger sprocket 111 about which a chain 112 is wrapped for delivery of rotative power to a sprocket 113. The sprocket 113 is mounted on a shaft 114 which carries the forwardly disposed cooperative leaf stripping roll 44. A plurality of idler pulleys and sprockets are provided in the device for maintaining the several belts and chains with proper tautness. An idler sprocket 115 is mounted on the frame member 70 and maintains the chain 95 sufficiently tight for proper drive between the sprockets 96 and 97. Similarly, an idler V-belt 116 is mounted on the depending frame member 48 for the purpose of maintaining the V-belt 105 sufficiently tight to effect drive between the pulley 104 and the pulley 106.

In the operation of the device of Fig. 4, the cane stalks are fed to the cooperative feed rolls 42 and 43 whereupon the stalks are propelled at relatively high speeds rearwardly and in a horizontal plane into the path of the rotating cutter member 51. The angular disposition of the rotating cutter is such that the blades move downwardly and forwardly upon the horizontally disposed stalks. Cutting of the stalks is accomplished through the cooperative driving of the stalks at a high rate of speed and the downwardly and forwardly swinging knife blades. The propelling of the stalks causes the stalks to be moved into the rotating blades, and the angular positioning of the blades causes the stalks to ride up on the blades. The stalks are thus cut without assistance from any shear plate or the cooperative leaf stripping rolls positioned beneath the rotating knife member. As the knife blades rotate downwardly through the leaf stripping rolls 44 and 45, leaf and other light trash material is pushed downwardly between the rolls, and the rotation of the leaf stripping rolls downwardly along their inwardly facing surfaces causes the trash and leaves to be thrown out through the bottom of the cane harvester. The fan 73 discharges a blast of air through its nozzle 83 downwardly over the cane cutting operation and assists in the downward discharge of the trash material. The relatively clean short lengths of cane stalk pass rearwardly onto the elevator 68 whereupon they are delivered upwardly and rearwardly to a trailing wagon or the like.

As best shown in Fig. 5, the device is identical to the modified form of Fig. 4 except for the removal of the leaf stripping rolls beneath the rotary knife chopper. Cooperative corrugated feed rolls 117 and 118 are adapted to propel cane stalks 119 at a relatively high rate of speed in a horizontal plane rearwardly into the field of travel of the rotary knife chopper 120. As previously described, in the operation of the device of Fig. 4 the stalks 119 are propelled at such a great rate of speed that they tend to climb the inclined knife chopper 120, and as particularly shown in Fig. 5 the end 121 of the stalk is shown curved upwardly and climbing the blade 122 of the rotary chopper 120. A sectional view has been taken on the line 6—6 of Fig. 5 for the purpose of showing in detail the construction of the rotary knife chopper 120 and also the rotary chopper 51 of the device of Fig. 4. The corrugated feed rolls have been shown in dot-dash lines in Fig. 6 so that the horizontal plane in which the cane stalks are propelled will be definitely located with respect to the inclined rotary chopper mechanism 120. As shown in Fig. 6, the rotary chopper mechanism 120 comprises two cooperative rotating cutters 120a and 120b. Each of the rotary members 120a and 120b comprises hub members 123 and 124 respectively. Radially extending knives 122a and 122b are mounted on the hubs 123 and 124 respectively in equal spacing therearound. The direction of travel of the rotary chopper 120a is indicated by the arrow 125, and similarly the direction of rotation of the rotary chopper 120b is indicated by the arrow 126. It should be observed that the rotating choppers swing inwardly toward each other and down across the horizontal plane in which the stalks are propelled at great speeds. In order that all of the stalks passing through the relatively wide feed rolls 17 and 18 are cut, the radially extending blades 122a and 122b are sufficiently long to project over into each other's paths. Thus in order that the blades do not strike each other, the timings of the rotary choppers 120a and 120b are offset one from the other, and as shown in Fig. 6 the blade 122a passes through the horizontal plane indicated by the numeral 127 at the juncture between the feed rolls 117 and 118 prior to the passage therethrough of the blade 122b. The overlap of the blades 122a and 122b positively insures the cutting of all of the cane stalks that pass therethrough.

The operation of the modification of Figs. 5 and 6 is identical to the operation of Fig. 4 except for the elimination of the leaf stripping rolls. The cutting of the stalks in both the modified forms of Figs. 4 and 5 occurs in mid air without the benefit of any shear plate or the like. The propulsion of the stalks at high speeds directly into the angularly disposed blades causes the stalks to be angled upwardly rather than pushed downwardly by the rotating knife blades and hence there is no need for a shear means or leaf stripping rolls as an aid to the cutting of the stalks. It is obvious therefore that the stalk cutting device of this invention may be utilized both with and without the leaf stripping rolls. Further, the feed rolls shown as cooperative corrugated rolls may take any form capable of propelling cane stalks in a horizontal plane at relatively high speeds.

Numerous details of construction may be varied throughout a wide range without departing from the principles disclosed herein, and I therefore do not propose limiting the patent granted hereon otherwise than as necessitated by the appended claims.

What is claimed is:

1. A cane stalk cutter comprising means for feeding longitudinally extending stalks in a horizontal plane from a forward position to a rearward position at relatively high speeds, and a transversely disposed rotary knife chopper having an axis of rotation angularly disposed from a high forward position to a low rearward position whereby the knife chopper cuts transversely through the longitudinally fed stalks downwardly and forwardly against the direction of travel of the stalks whereupon the stalks being fed toward the rotary knife chopper climb upwardly and rearwardly on the knife chopper.

2. A cane stalk cutter as set forth in claim 1 in which the rotary knife chopper includes a pair of spaced apart rotors having radially extending blades, and said rotors rotating inwardly toward each other.

3. A cane stalk cutter as set forth in claim 2 in which the blades of the spaced apart rotors alternately pass through the stalks to be cut and the blades project into and overlap to some extent each other's paths.

4. A cane stalk cutter as set forth in claim 3 in which a pair of cooperative leaf stripping rolls is positioned just beneath the horizontal plane of passage of the stalks and at right angles to the longitudinally extending stalks, and said rolls longitudinally spaced to permit passage of the blades between the rolls.

5. A cane stalk cutter as set forth in claim 4 in which the means for feeding the stalks at high speeds comprises a pair of cooperative corrugated feed rolls.

6. A cane stalk cutter as set forth in claim 1 in which a fan is provided to direct a blast of air downwardly and forwardly over the position of stalk cutting.

References Cited in the file of this patent

UNITED STATES PATENTS

| | | |
|---|---|---|
| 99,600 | Schenck | Feb. 8, 1870 |
| 169,607 | Whitney | Nov. 2, 1875 |
| 336,500 | Tintle | Feb. 16, 1886 |
| 378,112 | Rider | Feb. 21, 1888 |
| 494,946 | Watson | Apr. 4, 1893 |
| 1,138,300 | Letin et al. | May 4, 1915 |
| 1,365,213 | Woodland | Jan. 11, 1921 |
| 1,418,104 | Spiselman | May 30, 1922 |
| 1,722,780 | Wilkes et al. | July 30, 1929 |
| 1,988,901 | Hoefling | Jan. 22, 1935 |
| 2,208,787 | Brown | July 23, 1940 |
| 2,377,443 | Pallman | June 5, 1945 |
| 2,482,523 | Urschel et al. | Sept. 20, 1949 |
| 2,519,643 | Garrigue et al. | Aug. 22, 1950 |
| 2,537,717 | Tourneur et al. | Jan. 9, 1951 |
| 2,540,014 | Smith | Jan. 30, 1951 |